Jan. 20, 1970
C. BERGER ET AL
3,490,953
METHOD OF MAKING INORGANIC ION EXCHANGE MEMBRANE
Filed May 26, 1965
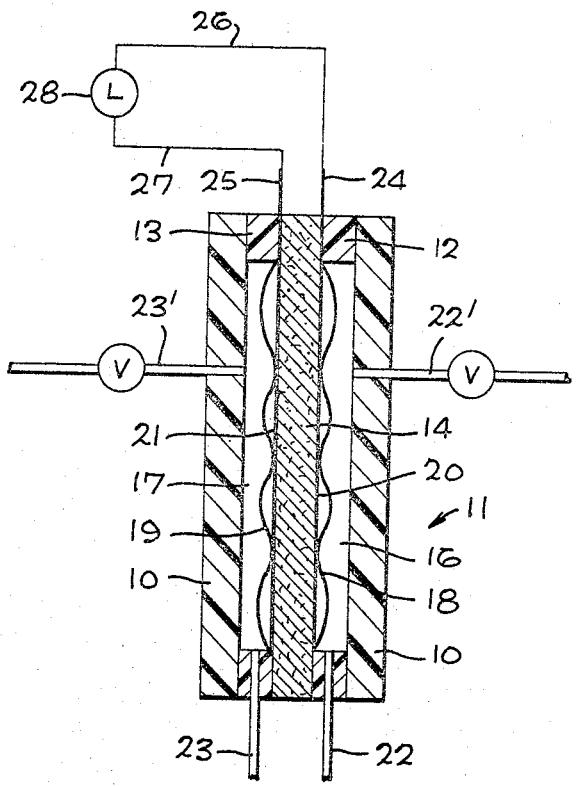
CARL BERGER
FRANK C. ARRANCE
INVENTORS
BY Max Girden
ATTORNEY United States Patent Office 3,490,953
Patented Jan. 20, 1970

3,490,953
METHOD OF MAKING INORGANIC ION
EXCHANGE MEMBRANE
Carl Berger, Santa Ana, and Frank C. Arrance, Costa
Mesa, Calif., assignors, by mesne assignments, to
McDonnell Douglas Corporation, Santa Monica, Calif.,
a corporation of Maryland
Filed May 26, 1965, Ser. No. 458,919
Int. Cl. H01m 3/02
U.S. Cl. 136—153                                    15 Claims

ABSTRACT OF THE DISCLOSURE

Production of ion exchange membranes having high strength and good conductivity, by presintering a substance in the form of a water insoluble hydrous metal oxide, e.g., hydrous zirconium dioxide, or an acid salt, and an inorganic acid such as phosphoric acid when such substance is said hydrous metal oxide, and mixing the presintered material with an inorganic acid such as phosphoric acid, and a water balancing agent such as an aluminosilicate. By further treating the resulting mixture including said presintered material, with an inorganic acid, such as phosphoric acid, and further sintering the so treated mixture, ion exchange membranes of substantially higher transverse strength and good conductivity can be obtained. Such ion exchange membranes are particularly useful in fuel cells, e.g., hydrogen-oxygen and hydrocarbon fuel cells.

---

This invention relates to ion exchange membranes which are particularly useful in fuel cells, and is especially concerned with novel procedure for the production of ion exchange membranes having high strength and good conductivity, to novel high strength highly conductive ion exchange membranes, and to fuel cells embodying same.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

The term fuel cell applies to an electrochemical cell in which chemical energy is converted to electrical energy by means of reactants consisting of fuel and oxidizer fed continuously into the cell from external sources. Oxidation occurs at the anode and reduction takes place at the cathode. In the most well known type of fuel cell, known as the hydrogen-oxygen fuel cell, hydrogen constitutes the fuel and is oxidized to the hydrogen ion at the anode, and the hydrogen ion migrates through the cation selective electrolyte to the cathode where it combines with hydroxyl ions formed by reduction of the oxygen or oxidizer at the cathode. Hydrocarbon fuel cells in which hydrocarbon fuels are oxidized by means of oxygen to produce an electric current and other types of fuel cells such as ammonia and hydrazine fuel cells are known also.

One of the important problems in the production of ion exchange membranes and particularly inorganic ion exchange membranes for use in fuel cells of the above types, is the production of ion exchange membranes of sufficient strength to withstand sudden shocks and to retain their physical integrity over an extended period of time, without disintegration, especially since such fuel cell membranes generally have a relatively thin transverse section. This problem is rendered still more difficult because any improvement or increase in transverse strength of the ion exchange membrane must be made without any significant sacrifice of the conductivity of the membrane.

It is accordingly one object of the invention to provide novel procedure for the production of ion exchange membranes having substantially increased transverse strength, and which are especially useful in fuel cells.

Another object is to provide procedure for readily producing high strength inorganic ion exchange membranes having good electrical conductivity and which are particularly useful in fuel cells, e.g. hydrogen-oxygen and hydrocarbon fuel cells.

Still another object of the invention is the provision of procedure for producing efficient inorganic ion exchange membranes, for example, zirconium phosphate membranes, having high physical integrity, strength and cohesiveness, and having high ionic conductivity, particularly when employed in fuel cells using gaseous or liquid fuel such as hydrogen, ammonia, hydrocarbons and the like.

A still further object is to provide improved ion exchange membranes having the characteristics noted above including high transverse strength and good ionic conductivity, and the provision of improved fuel cells incorporating such improved ion exchange membranes of high strength and high conductivity.

Other objects and advantages of the invention will appear hereinafter.

The above objects and advantages are achieved according to the invention and an ion exchange membrane of high transverse strength and high conductivity provided, and especially suited for application in fuel cells, by presintering a substance selected from the group consisting of water insoluble hydrous metal oxides and water insoluble acid salts, and an inorganic acid when said substance is said hydrous oxide, and mixing said presintered material with an inorganic acid, e.g. phosphoric acid, and a material referred to herein as a water balancing agent, and described in greater detail hereinafter. As another feature of the invention, it has been found that by further treating the resulting mixture including presintered material, with an inorganic acid followed by additional sintering, ion exchange membranes of substantially higher transverse strength can be obtained without any sacrifice of ionic conductivity.

Thus, inorganic ion exchange membranes are produced according to the novel invention procedure which have a transverse strength of at least about 4,000 p.s.i. and which can range from about 4,000 to about 10,000 p.s.i., and ion exchange membranes can be obtained according to the invention having a transverse strength of the order of about 8,000 to about 10,000 p.s.i. where the presintering operation described above is followed by a subsequent sintering operation as noted above. The high strength ion exchange membranes thus formed have good to excellent ionic conductivity. Thus, for example, the ion exchange membranes produced according to the invention can have a resistance of less than about 30 ohm/cm.$^2$ at 25° C., e.g., ranging from about 3 to about 20 ohm/cm.$^2$, and often less than about 10 ohm/cm.$^2$, at 25° C. On the other hand inorganic ion exchange membranes produced by prior art procedure have a transverse strength ranging generally from about 500 to about 2500 p.s.i. and a conductivity corresponding to a resistance of about 50 to about 150 ohm/cm.$^2$.

Fuel cell membranes produced according to the invention procedure and of high strength and high conductivity have been found to be particularly advantageous for use in fuel cells particularly hydrogen-oxygen and hydrocarbon fuel cells at varying temperatures. Thus, for example, such ion exchange membranes have functioned efficiently in hydrogen-oxygen fuel cells at temperatures of the order of 65° C., and also function satisfactorily in hydrocarbon fuel cells operating at temperatures of the order of 100 to 125° C.

One of the starting materials employed according to the invention procedure for producing the ion exchange membrane is a water insoluble hydrous metal oxide. Examples of such hydrous oxide ion exchange or ion conducting materials which can be employed according to the invention procedure preferably include the insoluble hydrous oxides of zirconium, titanium, antimony, tungsten, silicon, scandium, bismuth, vanadium, molybdenum, chromium and aluminum. The term "insoluble hydrous metal oxides" includes those water insoluble solids containing one or more metal cations, oxide ions, hydroxide ions, and an indeterminate quantity of water, and includes hydrous hydroxides. Such hydrous metal oxides do not necessarily have a definite stoichiometric combination or a definite crystal structure and they may contain ionic impurities as well. Examples of additional hydrous metal oxides are given in applicants' copending application Ser. No. 326,709, filed Nov. 29, 1963, and such disclosure is incorporated herein by reference.

Also, insoluble inorganic acid salts can be employed as ion conducting starting material in the invention procedure to form ion exchange membranes. In general, insoluble acid salts such as the insoluble phosphates, borates, sulfates, tungstates, molybdates, phosphomolybdates and vanadates can be employed. The cation of such acid salts include metals such as zirconium, titanium, antimony, tin, tungsten, thorium and vanadium. The acid phosphates are preferred, and examples of preferred specific insoluble acid salts include zirconium phosphate, zirconium sulfate, titanium molybdate, titanium phosphate, tin phosphate, thorium phosphate, and the like.

The preferred starting materials according to the invention procedure are the insoluble hydrous metal oxides. When such starting materials are employed, such material is mixed with an inorganic acid prior to the initial sintering operation. Such inorganic acids can be any of those used to form the above noted acid salts, and including phosphoric acid, boric acid, molybdic acid, phosphomolybdic acid, tungstic acid, and sulfuric acid. The acid, preferably phosphoric acid, can be employed in stoichiometric amount with respect to the hydrous metal oxide, such as hydrous zirconium dioxide, to form the corresponding acid salt, e.g., zirconium phosphate, but an excess of oxide or acid can be used. According to one mode of operation, approximately equal parts by weight of the metal oxide and acid can be used.

The presintering operation is carried out by subjecting a granulated or compacted mixture of the hydrous metal oxide and inorganic acid, or of the acid salt, to temperature ranging from about 200 to about 1,000° C., preferably between about 300 and about 600° C.

As previously noted, in the invention procedure, after presintering, the resulting presintered material composed essentially of an acid salt, e.g., zirconium phosphate, is treated with an inorganic acid of the above type, preferably phosphoric acid, and there is also added a so-called water balancing agent. These water balancing agents are inorganic additives of controlled water vapor characteristics capable of retaining water and providing suitable water vapor pressure especially at temperatures above 100° C. when such ion exchange membranes are incorporated in a fuel cell.

Any water balancing agent can be incorporated in the ion exchange or ion conducting material which will balance the amount of water in the membrane at a given temperature, and particularly at temperatures above 100° C. to provide maximum conductivity of such membrane at such temperature. Thus, water balancing agents can be employed which when present in an inorganic membrane incorporated in a fuel cell provide a water vapor pressure of from about 10 to about 200 mm. at 100° C. and atmospheric pressure. Examples of suitable water balancing agents which can be employed together with the ion conducting material in the invention procedure include aluminosilicates, activated alumina, aluminum sulfate, silicic acid, colloidal silica, silica gel, phosphorus pentoxide, copper sulfate, ammonium acid phosphate and calcium chloride. The preferred water balancing agents for purposes of the invention are the aluminosilicates such as those marketed as Zeolite, Zeolon and the like, and including, for example, sodium and potassium aluminosilicates, and magnesium, calcium, barium and strontium aluminosilicates. These materials can be used separately, but often mixtures of these aluminosilicates are used, for example, complex mixtures of both the alkali metal and alkaline earth metal aluminosilicates.

Ion exchange membranes containing a water balancing agent of the type described above, are described and claimed in the copending application Ser. No. 405,079 filed Oct. 20, 1964 of Carl Berger and Andrew D. Kelmers.

Although various portions of presintered material, inorganic acid and water balancing agent can be employed, the amount of presintered material can range from about 10 to about 80 parts, the amount of acid component, e.g., phosphoric acid, can range from about 10 to about 50 parts, based on 100% acid, and the amount of water balancing agent, e.g., an aluminosilicate can range from about 5 to about 50 parts, by weight. The amount of water balancing agent present in the composition can range from about 1 to about 60%, preferably from about 5 to about 50%, by weight. According to one preferred embodiment each of these components can be employed in equal amount, so as to provide a 1:1:1 mixture by weight of the three components.

The mixture of the above three components including presintered material, inorganic acid and water balancing agent in suitable proportions as described above, is then formed into membranes, preferably by compacting such mixture at pressures, e.g., of the order of about 2,000 to about 10,000 p.s.i.

In the invention procedure described above, it is believed that the hydrous metal oxide reacts with the inorganic acid in the preferred initial starting mixture to form the corresponding insoluble acid salt. However, it will be understood that the ion exchange membrane following the presintering operation can contain some of the inorganic metal oxide material. It is further believed that in the ion exchange membrane produced according to the invention, there is increased coordination bonding between the acid salt, e.g., zirconium phosphate, of the ion exchange matrix and the water balancing agent, e.g., aluminosilicate, as compared to prior art ion exchange membranes, thus aiding to confer improved strength and conductivity characteristics on the membrane hereof. However, the invention is not to be taken as limited by any theory of the function or mode of cooperation of the components of the ion exchange membrane.

It will be understood that since in the above described preferred mode of procedure wherein hydrous metal oxide and inorganic acid are employed in the starting material, the presintering operation will result in the formation of an insoluble acid salt, e.g., phosphate, such as zirconium phosphate, such salt or acid phosphate per se can be employed as the starting material, as previously noted, in place of the mixture of hydrous metal oxide and inorganic acid. Thus, for example, instead of employing a mixture of hydrous zirconium dioxide and phosphoric acid as starting materials the corresponding acid salt, e.g., zirconium phosphate, can be so employed, and this material can be subjected to the above noted presintering operation. However, it has been found preferable to employ the insoluble hydrous metal oxide together with the inorganic acid as starting materials rather than the corresponding acid salt, since it has been observed from experience that the resulting ion exchange membrane is of higher strength than when employing the acid salt per se as starting material.

By presintering the above noted starting materials, namely the hydrous metal oxide and the inorganic acid, and then treating the presintered material with acid and incorporating therein the water balancing agent, inorganic membranes of high strength and high ionic conductivity are produced. Although the transverse strength of the resulting ion exchange membranes are of the order of about 2 or more times the transverse strength of the membranes produced by prior art procedure, such increased strength thus attained is not adversely affected by any decrease in ionic conductivity and the ionic conductivity of the ion exchange membranes thus produced is good to excellent.

It has been further unexpectedly found that if the mixture, or the presintered ion exchange membrane, formed in the above described operations by mixing presintered material with an inorganic acid and a water balancing agent, is further treated with an inorganic acid of the type described above, e.g., phosphoric acid, and further sintered, ion exchange membranes of substantially greater enhanced strength can be obtained, again without sacrifice of ionic conductivity. The inorganic acids which can be employed in this step are the same as those described above and which are employed in the acid treatment step prior to the initial sintering operation, including phosphoric acid, boric acid, molybdic acid, phosphomolybdic acid, tungstic acid, and sulfuric acid, preferably phosphoric acid. The amount of inorganic acid employed preferably is that which is sufficient substantially to saturate the above mixture or presintered membrane. Thus, an amount of about 1 to about 20% of inorganic acid, e.g. phosphoric acid or boric acid, by weight of such mixture or presintered membrane can be employed, such range being merely illustrative. Treatment with such inorganic acid is carried out preferably at about ambient temperature, although such temperature of treatment can be varied.

The increase in transverse strength of the ion exchange membrane resulting from such further acid treatment and the second sintering operation can be of the order of twice that of the ion exchange membrane produced by presintering only, and without the additional acid treatment and sintering operations. Hence, ion exchange membranes produced according to this preferred procedure employing both a presintering and final sintering operation can have a transverse strength of the order of about 8,000 to about 10,000 p.s.i. as compared to about 5,000 p.s.i. for the ion exchange membrane produced according to the above procedure but in the absence of the final sintering operation.

As in the presintering operation, sintering temperatures for the final sintering operation can vary depending upon the particular composition of the materials of the mixture, such temperatures ranging from about 200 to about 1,000° C., preferably from about 300 to about 600° C.

The accompanying drawing illustrates incorporation of an ion exchange membrane produced according to the invention in a fuel cell, e.g., a hydrogen-oxygen or a hydrocarbon fuel cell.

Referring to the drawing, the fuel cell 11 comprises a pair of back plates 10 which when assembled hold together a pair of adjacent neoprene gaskets 12 and 13 with the ion exchange membrane of enhanced strength and conductivity according to the invention, designated 14, sandwiched between the gaskets 12 and 13. In this embodiment the ion conducting membrane 14 is composed of zirconium phosphate containing an aluminosilicate as a water balancing agent, produced according to the invention procedure. The assembly of members 10, 12, 13 and 14 can be accomplished by use of any suitable adhesive or glue.

The central portion of the ion conducting membrane 14 is covered or coated with a platinum black catalyst on both sides of the membrane, indicated at 20 and 21. Prior to assembly of members 10, 12, 13 and 14, tantalum screens 18 and 19 impregnated with platinum black, and preferably also Teflon for waterproofing purposes, are placed in the central portion of gaskets 12 and 13, respectively, with the peripheral edges of the screen positioned between membrane 14 and the respective gaskets 12 and 13. Following assembly of the above noted parts, it will be seen that chambers 16 and 17 are formed on opposite sides of the ion conducting membrane 14, chamber 16 containing the screen 18 and the catalyst electrode 20, and chamber 17 containing screen 19 and the catalyst electrode 21. The screens 18 and 19 are of a corrugated or mesh material.

The fuel cell 11 is provided with a valved inlet 22′ to chamber 36 for passage of an oxidizer, e.g., oxygen gas, into such chamber, and a valved inlet 23′ to chamber 17, for passage of hydrogen in the case of a hydrogen-oxygen fuel cell, or a hydrocarbon, e.g., ethane, in the case of a hydrocarbon fuel cell, into such chamber, via a conduit 29. A first conduit 22 which passes through gasket 12 and communicates with chamber 16, serves for removal of excess water and excess oxygen gas from chamber 16, and a second conduit 23 which passes through the gasket 13 and communicates with the opposite gas chamber 17, serves as an outlet for excess hydrogen, or for excess hydrocarbon and carbon dioxide in the case of a hydrocarbon fuel cell, from chamber 17. Terminals 24 and 25 are connected respectively to the tantalum screens 18 and 19, such terminals extending exteriorly of the fuel cell. Terminals 24 and 25 are connected in an external circuit including the electrical wires 26 and 27 and a load indicated at 28.

Where the fuel cell described above is employed as a hydrogen-oxygen fuel cell, hydrogen in chamber 17 reacts at the catalyst electrode or anode 21 and is oxidized to form hydrogen ion which migrates through the ion conducting membrane 14 and reacts with hydroxyl ion adjacent the catalyst electrode or cathode 20, which hydroxyl ion is formed by reduction of the oxygen in chamber 16 at such catalyst electrode or cathode, forming water.

Following are examples of practice of the invention.

EXAMPLE 1

A mixture of equal parts of hydrous zirconium dioxide and phosphoric acid is prepared, dried and granulated. Such mixture is then presintered at temperature of about 500° C. for about 20 hours. Then the presintered mixture is mixed with phosphoric acid and Zeolon H (an aluminosilicate) in a 1 to 1 to 1 ratio by weight of these three materials. The resulting mixture is compacted at about 5,000 p.s.i. pressure and formed into membranes.

These membranes formed from the presintered materials have a transverse strength of about 5,000 p.s.i. and have low electrical resistance of less than 10 ohm/cm.$^2$ at room temperature. When incorporated in a fuel cell as described above and illustrated in the drawing and the fuel cell is operated as a hydrogen-oxygen fuel cell at 65° C. such fuel cell operates effectively for more than 500 hours at 0.5 volt and a current density of about 20 ma./cm$^2$.

In comparison with the above procedure, membranes are prepared by mixing hydrous zirconium dioxide, phosphoric acid and Zeolon H in a 1 to 1 to 1 weight ratio of such components. This mixture is compacted into membranes and such membranes sintered at 500° C. The resulting membranes have a transverse strength of only about 2,500 to about 2,700 p.s.i., as compared to about twice that value or about 5,000 p.s.i. for the membranes prepared by the presintering procedure of the invention and described above.

EXAMPLE 2

The membranes formed in Example 1 by the presintering procedure of the invention are saturated with H$_3$PO$_4$, and subjected to an additional sintering at about 500° C. for a period of about 60 minutes. The resulting membranes have a transverse strength of the order of about 10,000 p.s.i. as compared to about 5,000 p.s.i. for the presintered membrane. These high strength membranes produced by the second sintering operation, however, also have a low electrical resistance of the order of the electrical resistance of the presintered membranes of Example 1, i.e., an electrical resistance less than 10 ohm/cm.$^2$ at ambient or room temperature.

An ion exchange membrane produced by this dual sintering procedure is sprinkled on opposite sides thereof with platinum black and employed as the ion exchange membrane in a fuel cell as described above and illustrated in the drawing, with tantalum screens impregnated with platinum black pressed against opposite sides of the membrane as described above and illustrated in the drawing. The fuel cell operates effectively employing hydrocarbon fuels such as ethane, propane and butane, and oxygen as oxidizer, at temperatures of about 100 to about 125° C.

EXAMPLE 3

A mixture of about one part by weight of hydrous scandium oxide and one part by weight of phosphoric acid is sintered at temperature of about 400° C. A mixture is then formed of equal parts by weight of each of the presintered material, phosphoric acid and Zeolon H, and such mixture compacted at high pressure into the form of thin membranes.

These presintered membranes have a transverse strength of the order of about 4,500 p.s.i. and internal resistance less than about 20 ohm/cm.$^2$. When incorporated into a fuel cell of the type described above and illustrated in the drawing operating as a hydrogen-oxygen fuel cell, such fuel cell operates effectively.

EXAMPLE 4

A mixture of equal parts by weight of aluminum oxide and boric acid is prepared and such mixture presintered at temperature of about 600° C. The resulting presintered material is then mixed with boric acid and Zeolon H, employing weight proportions of the three components, respectively, of about 2 to 1 to 1. Such mixture is then compacted into the form of thin membranes.

Such membranes have a high transverse strength of the order of 4,500 p.s.i and an internal resistance between about 3 and about 20 ohm/cm.$^2$. Such membranes operate effectively in a fuel cell of the type described above and illustrated in the drawing operated as a hydrogen-oxygen fuel cell.

EXAMPLE 5

The fuel cell membranes prepared in Example 4 above are further treated with boric acid solution and sintered at temperature of about 500° C. The resulting membranes now have a transverse strength of the order of about 9,000 to about 10,000 p.s.i. but still retaining low electrical resistance of the order of the membranes prepared in Example 4. The dually sintered membranes when incorporated in a fuel cell as in Example 4 produce results similar thereto.

EXAMPLE 6

The procedure of Example 4 is substantially followed for the preparation of the presintered material. Such presintered material is then mixed in a proportion of about two parts by weight of such material with one part of phosphoric acid and one part of colloidal silica, and the resulting mixture compacted in the form of membranes.

The resulting membranes have high transverse strength of the order of about 5,500 p.s.i. and low electrical resistance of less than about 20 ohm/cm.$^2$ and operate in a satisfactory manner in a fuel cell of the type described above and illustrated in the drawing employing hydrogen fuel and oxygen as oxidizer.

EXAMPLE 7

A mixture of about two parts of hydrous titanium dioxide and one part of phosphoric acid is prepared and such mixture sintered at temperature of about 600° C. The resulting presintered material is then mixed with phosphoric acid and Zeolon H employing a weight proportion of about 60% of the presintered material, about 25% of the phosphoric acid and about 15% of the Zeolon H. The resulting mixture is then compacted and formed into a membrane.

The resulting membranes have a high transverse strength of about 5,000 p.s.i. and low electrical resistance less than about 25 ohm/cm.$^2$. Such membranes operate effectively in a fuel cell as described above and illustrated in the drawing employed as a hydrogen-oxygen fuel cell.

The presintered membranes prepared above are subjected to treatment first with phosphoric acid and then to a second sintering operation at a temperature of about 600° C. The resulting dually sintered membranes have a substantially higher transverse strength of the order of about 10,000 p.s.i. while still retaining the low electrical resistance noted above for the presintered membrane. The dually sintered membranes when employed in the hydrogen-oxygen fuel cell as in the case of the above presintered membranes, operate in a highly satisfactory manner therein, and without any sign of disintegration or deterioration over a prolonged period of operation.

EXAMPLE 8

The presintered membranes formed in Example 7 by presintering a mixture of hydrous titanium dioxide and phosphoric acid, are then mixed with molybdic acid and silica gel, employing a weight proportion of about 60% of the presintered material, 25% molybdic acid and 15% silica gel. The resulting membranes have a transverse strength of about 4,000 p.s.i. with low electrical resistance of the order of the presintered membranes of Example 7, and operate effectively in a hydrogen-oxygen fuel cell.

These presintered membranes when subjected first to saturation with molybdic acid solution and then to a second sintering operation at a temperature of about 400° C. have a substantially increased transverse strength of about 9,000 to 10,000 p.s.i. with low electrical resistance comparable to that of the presintered membranes. Such dually sintered membranes operate effectively in a fuel cell.

EXAMPLE 9

Equal parts by weight of hydrous molybdic oxide and phosphoric acid are mixed and the resulting mixture sintered at a temperature of about 700° C. The resulting presintered material, phosphoric acid and Zeolon H are mixed together in a proportion of 1 to 1 to 1 by weight, and compacted to form thin membranes. The resulting membranes have a high transverse strength of the order of about 5,000 p.s.i. and low electrical resistance less than about 30 ohm/cm.$^2$. Such membranes operate effectively when incorporated in a fuel cell as described above and illustrated in the drawing operating as a hydrogen-oxygen fuel cell.

EXAMPLE 10

A presintered membrane is formed by first mixing together 60% by weight of hydrous molybdic oxide and 40% by weight of tungstic acid, and the resulting mixture sintered at a temperature of about 450° C. The presintered material is then mixed with tungstic acid and activated alumina in a proportion of about two parts of the presintered material, 0.75 part of tungstic acid and one part of the activated alumina. The resulting mixture is then compacted to form membranes, such membranes having a high transverse strength of about 4,000 p.s.i. and low electrical resistance less than 20 ohm/cm.$^2$.

When such membranes are incorporated in a fuel cell as described above and illustrated in the drawing, operating on hydrocarbon fuels and at temperatures of about 100 to about 125° C., effective operation is obtained.

EXAMPLE 11

A presintered membrane is produced by sintering zirconium phosphate at a temperature of about 550° C. for about 60 minutes. Such presintered zirconium phosphate material is then mixed with phosphoric acid and Zeolon H in proportion of about 1 to 1 to 1, and the resulting mixture compacted and formed into thin membranes.

Such membranes have a transverse strength of about 4,000 to about 5,000 p.s.i., somewhat less than the transverse strength of the membranes produced in Example 1 by the presintering of hydrous zirconium dioxide, and phosphoric acid. The membranes of this example have low electrical resistance less than 10 ohm/cm.$^2$ and when incorporated in a fuel cell of the type described above and illustrated in the drawing operated as a hydrogen-oxygen fuel cell at about 65° C., effective operation is obtained similar to that in Example 1.

EXAMPLE 12

The presintered membranes produced according to Example 11 are further subjected to treatment with phosphoric acid to saturate the membranes and the membranes are then sintered at temperatures of about 600° C., resulting in membranes having a substantially higher transverse strength of about 9,000 to about 10,000 p.s.i. accompanied by low electrical resistance less than about 20 ohm/cm.$^2$ at about 25° C.

Such membranes when incorporated in a fuel cell as described above and shown in the drawing have great durability therein and operate effectively over an extended period of time.

From the foregoing, it is seen that the invention provides a novel presintering procedure followed by treatment with additional acid bonding material and water balancing or filler material, so that when the resulting mixture is compacted into thin membranes, such membranes have high transverse strength not heretofore possessed by prior art inorganic ion exchange membranes, with the additional highly advantageous feature that by further treating such membranes with an inorganic acid as described above, followed by sintering or resintering such presintered membranes, the resulting membranes have substantially higher transverse strength while retaining low electrical resistance properties. The membranes produced according to the invention are highly effective when employed as ion exchange membranes in fuel cells, particularly hydrogen-oxygen and hydrocarbon fuel cells.

It will be understood that various modifications and adaptations of the invention can be made by those skilled in the art without departing from the spirit of the invention, and accordingly the invention is not to be taken as limited except by the scope of the appended claims.

We claim:

1. The method of forming a high strength ion conducting membrane which comprises presintering a substance selected from the group consisting of water insoluble hydrous metal oxides and water insoluble acid salts, and an inorganic acid when said substance is said hydrous metal oxide, and mixing said presintered material with an inorganic acid and a material which retains a sufficient amount of water and provides a water vapor pressure of about 10 to about 200 mm., at temperatures of about 100° C. when said membrane is incorporated in a fuel cell.

2. The method of forming a high strength ion conducting membrane which comprises presintering a substance selected from the group consisting of water insoluble hydrous metal oxides and water insoluble acid salts, and an inorganic acid when said substance is said hydrous metal oxide, and mixing said presintered material with an inorganic acid and a material selected from the group consisting of an aluminosilicate, activated alumina, aluminum sulfate, silicic acid, colloidal silica, silica gel, phosphorus pentoxide, copper sulfate, ammonium acid phosphate and calcium chloride.

3. The method of forming a high strength ion conducting membrane which comprises presintering a substance selected from the group consisting of water insoluble hydrous metal oxides and water insoluble acid salts, and an inorganic acid when said substance is said hydrous metal oxide, said inorganic acid being selected from the group consisting of phosphoric acid, boric acid, molybdic acid, phosphomolybdic acid, tungstic acid, and sulfuric acid, and mixing said presintered material with an inorganic acid as above defined, and a material selected from the group consisting of an aluminosilicate, activated alumina, aluminum sulfate, silicic acid, colloidal silica, silica gel, phosphorus pentoxide, copper sulfate, ammonium acid phosphate and calcium chloride.

4. The method as defined in claim 3, employing a hydrous metal oxide selected from the group consisting of insoluble hydrous oxides of zirconium, titanium, antimony, tungsten, silicon, scandium, bismuth, vanadium, molybdenum, chromium, and aluminum.

5. The method as defined in claim 3, employing an insoluble acid salt selected from the group consisting of zirconium phosphate, zirconium sulfate, titanium molybdate, titanium phosphate, tin phosphate and thorium phosphate.

6. The method of forming a high strength ion conducting membrane which comprises presintering at temperatures between about 200 and about 1,000° C., a substance selected from the group consisting of water insoluble hydrous metal oxides and water insoluble acid salts, and an inorganic acid when said substance is said hydrous metal oxide, and mixing said presintered material with an inorganic acid and a material selected from the group consisting of an aluminosilicate, activated alumina, aluminum sulfate, silicic acid, colloidal silica, silica gel, phosphorus pentoxide, copper sulfate, ammonium acid phosphate and calcium chloride, said material being present in an amount of about 1 to about 60% by weight of the total composition.

7. The method of forming a high strength fuel cell membrane which comprises presintering at temperatures between about 200 and about 1,000° C., a substance selected from the group consisting of water insoluble hydrous metal oxides and water insoluble acid salts, and an inorganic acid when said substance is said hydrous metal oxide, and mixing about 10 to about 80 parts by weight of said presintered material with about 10 to about 50 parts by weight of an inorganic acid and about 10 to about 50 parts by weight of a material selected from the group consisting of an aluminosilicate, activated alumina, aluminum sulfate, silicic acid, colloidal silica, silica gel, phosphorus pentoxide, copper sulfate, ammonium acid phosphate and calcium chloride, and forming said mixture into a membrane.

8. The method as defined in claim 7, employing a hydrous metal oxide selected from the group consisting of insoluble hydrous oxides of zirconium, titanium, antimony, tungsten, silicon, scandium, bismuth, vanadium, molybdenum, chromium, and aluminum, and wherein said inorganic acid is selected from the group consisting of phosphoric acid, boric acid, molybdic acid, phosphomolybdic acid, tungstic acid, and sulfuric acid, and wherein said presintering is carried out at temperatures between about 300 and about 600° C., said mixture being formed into a membrane by compacting same under pressure.

9. The method of forming a high strength fuel cell membrane which comprises presintering at temperatures between about 300 and about 600° C., a mixture of hydrous zirconium dioxide and phosphoric acid, and mixing about 10 to about 80 parts by weight of said presintered material with about 10 to about 50 parts by weight of phosphoric acid based on 100% acid, and about 10 to about 50 parts by weight of an aluminosilicate.

10. The method of forming a high strength ion conducting membrane which comprises presintering a substance selected from the group consisting of water insoluble hydrous metal oxides and water insoluble acid salts, and an inorganic acid when said substance is said hydrous metal oxide, mixing said presintered material with an inorganic acid and a material which retains a sufficient amount of water and provides a water vapor pressure of about 10 to about 200 mm., at a temperature of about 100° C., when said membrane is incorporated in a fuel cell, treating the resulting mixture with an inorganic acid, and further sintering the so treated mixture.

11. The method of forming a high strength ion conducting membrane which comprises presintering at temperatures between about 200 and about 1,000° C., a substance selected from the group consisting of water insoluble hydrous metal oxides and water insoluble acid salts, and an inorganic acid when said substance is said hydrous metal oxide, and mixing said presintered material with an inorganic acid and material selected from the group consisting of an aluminosilicate, activated alumina, aluminum sulfate, silicic acid, colloidal silica, silica gel, phosphorus pentoxide, copper sulfate, ammonium acid phospate and calcium chloride, said material being present in an amount of about 1 to about 60% by weight of the total composition, treating the resulting mixture with an inorganic acid in an amount of about 1 to about 20% by weight of said mixture, and further sintering the so treated mixture at temperatures between about 200 and 1,000° C.

12. The method of forming a high strength fuel cell membrane which comprises presintering at temperatures between about 300 and about 600° C., a substance selected from the group consisting of water soluble hydrous metal oxides and water insoluble acid salts, and an inorganic acid when said substance is said hydrous metal oxide, and mixing about 10 to about 80 parts by weight of said presintered material with about 10 to about 50 parts by weight of an inorganic acid and about 10 to about 50 parts by weight of a material selected from the group consisting of an aluminosilicate, activated alumina, aluminum sulfate, silicic acid, colloidal silica, silica gel, phosphorus pentoxide, copper sulfate, ammonium acid phosphate and calcium chloride, said material being present in an amount of about 1 to about 60% by weight of the total composition, substantially saturating the resulting mixture with an inorganic acid, and further sintering the so treated mixture at temperatures between about 300 and about 600° C., said inorganic acid being selected from the group consisting of phosphoric acid, boric acid, molybdic acid, phosphomolybdic acid, tungstic acid, and sulfuric acid.

13. The method of forming a high strength ion conducting membrane which comprises presintering at temperatures between about 300 and about 600° C., a mixture of hydrous zirconium dioxide and phosphoric acid, and mixing about 10 to about 80 parts by weight of said presintered material with about 10 to about 50 parts by weight of phosphoric acid based on 100% acid, and about 10 to about 50 parts by weight of an aluminosilicate, substantially saturating the resulting mixture with phosphoric acid, and further sintering the so treated mixture at temperatures between about 300 and about 600° C.

14. The method of forming a high strength fuel cell membrane which comprises presintering at temperatures between about 300 and about 600° C. a mixture of about equal parts by weight of zirconium dioxide and phosphoric acid, and mixing said presintered material, phosphoric acid and an aluminosilicate in about 1:1:1 proportions by weight.

15. The method of forming a high strength fuel cell membrane which comprises presintering at temperatures between about 300 and about 600° C. a mixture of about equal parts by weight of zirconium dioxide and phosphoric acid, and mixing said presintered material, phosphoric acid and an aluminosilicate in about 1:1:1 proportions by weight, treating the resulting mixture with phosphoric acid in an amount of about 1 to about 20% by weight of said mixture, and further sintering the so treated mixture at temperatures between about 300 and about 600° C.

References Cited

UNITED STATES PATENTS

| | | | |
|---|---|---|---|
| 3,265,536 | 8/1966 | Miller et al. | 136—86 |
| 3,266,940 | 8/1966 | Caesar | 136—86 |
| 3,276,910 | 10/1966 | Grasselli et al. | 136—86 |

WINSTON A. DOUGLAS, Primary Examiner

D. L. WALTON, Assistant Examiner

U.S. Cl. X.R.

136—146, 148; 210—502; 252—63.5